Patented Sept. 25, 1951

2,568,809

UNITED STATES PATENT OFFICE 2,568,809

TETRAHALOMETHYLHEXESTROLS AND DERIVATIVES THEREOF

Emil Kaiser, Chicago, Ill., assignor to Armour and Company, Chicago, Ill., a corporation of Illinois No Drawing. Application February 14, 1948, Serial No. 8,318

5 Claims. (Cl. 260—619)

This invention relates to tetrahalomethylhexestrols and to derivatives thereof which have estrogenic properties. The invention further relates to processes for preparing such compounds.

I find that hexestrol may be reacted with formaldehyde and hydrogen halides to form a new series of compounds. These new substances may be called tetrahalomethylhexestrols and have the general formula:

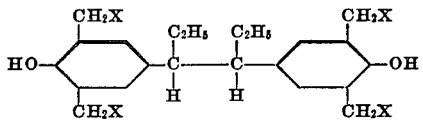

where X is a halogen radical.

In a preferred method of preparing these compounds, hexestrol is dissolved in a solvent, such as dioxane or acetic acid. Then concentrated hydrochloric acid and formaldehyde, either in the form of the solid paraformaldehyde or as a concentrated solution, are added. Gaseous hydrogen chloride is then bubbled through the mixture at temperatures ranging from 60 to 80° C. After several hours, the crystals which have formed are separated and purified by recrystallization from a suitable solvent.

In the above procedure, the mol ratio of formaldehyde to hexestrol is of great importance. At least four mols of formaldehyde are required for each mol of hexestrol. If a smaller ratio exists, oily or highly polymeric derivatives are formed.

In the first step in the above procedure, the use of any solvent which will dissolve hexestrol is possible, though I prefer to use solvents which are not themselves subject to halomethylation. Examples of such preferred solvents are dioxane, acetic acid and the like.

Any suitable solvent may be used for the recrystallization step, although some solvents require a much greater degree of care in order to obtain the desired crystals. The use of solvents like alcohol or acetone results in oily, undesirable products unless special care is taken. I prefer solvents which are chlorinated, such as carbontetrachloride, chloroform, and the like.

Specific examples illustrating the preferred practice in the preparation of my new composition are given as follows:

Example 1

1.35 g. of hexestrol were dissolved in 40 cc. of glacial acetic acid and 2.4 g. of paraformaldehyde and 20 cc. of concentrated hydrochloric acid were added simultaneously. At a temperature of 80° C. gaseous hydrogen chloride was bubbled through the solution. After a few minutes the solution turned cloudy and later oily drops appeared. After 5 hours white crystals separated and then the stream of gaseous hydrogen chloride was stopped. Water was added and the mixture extrac ed with ether. The ether solution was washed with water, dried over sodium sulfate and filtered. Then the ether was concentrated to a volume of about 10 cc. and 10 cc. of petroleum ether were added. The solution was filtered after the addition of some charcoal and petroleum ether added until cloudiness. The mixture was left in the cold overnight. Oil separated out, from which the clear upper layer was poured off. This upper layer was evaporated to dryness and the residue crystallized from chloroform. Crystallization can be facilitated by seeding the solution or adding small amounts of petroleum ether. Yield, 0.67 g., melting point 142–146°, softening previously at 139°. By recrystallization the melting point was raised to 156–159°. The compound analyzed well for tetrachloromethylhexestrol. Calculated for

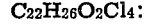

C, 56.9%; H, 5.6%; Cl, 30.6%. Found: C, 56.42%; H, 5.65%; Cl, 30.3%.

Example 2

1.08 g. of hexestrol were dissolved in 32 cc. of dioxane and 16 cc. of concentrated hydrochloric acid and 6 cc. of a 30% formaldehyde solution were added. Gaseous hydrogen chloride was bubbled through the mixture at 25–30° C. for 4 hours. Then water was added and the precipitate was dried in the vacuum desiccator and the dry material dissolved in 2 cc. of carbontetrachloride. 1.02 g. of crystalline tetrachloromethylhexestrol separated. Yield, 55% of the calculated yield.

Example 3

1.35 g. of hexestrol and 0.3 g. of paraformaldehyde (molar ratio: 1 mol of hexestrol to 2 mols of formaldehyde) were dissolved in 40 cc. of glacial acetic acid and 20 cc. of concentrated hydrochloric acid were added. Gaseous hydrogen chloride was bubbled through the mixture at 60-70°. After a short while formation of a solid precipitate was observed. When the formation of the precipitate ceased the stream of hydrogen chloride was shut off. A product was obtained which was insoluble in organic solvents, in alkali, and in acids.

*Example 4*

1.35 g. of hexestrol and 0.6 g. of paraformaldehyde (molar ratio: 1 mol of hexestrol to 4 mols of formaldehyde) were reacted as described in Example 3. Crystalline tetrachloromethylhexestrol was isolated.

*Example 5*

1.35 g. of hexestrol were dissolved in 40 cc. of glacial acetic acid and 2.4 g. of paraformaldehyde and 20 cc. of concentrated hydrobromic acid were added simultaneously. At a temperature of 40° C. gaseous hydrogen bromide was bubbled through the solution. The stream of hydrogen bromide was stopped after 5 hours, and water was added to the solution containing the white crystals. The mixture was extracted with ether. The ether solution was washed, dried, and concentrated, and an equal volume of petroleum ether was added. The mixture was left in the cold overnight. Oil separated out, from which the clear upper layer was poured off. This upper layer was evaporated to dryness and the residue crystallized from chloroform. The compound analyzed well for tetrabromomethylhexestrol.

*Example 6*

1.08 g. of hexestrol were dissolved in 32 cc. of dioxane and 16 cc. of concentrated hydrobromic acid and 6 cc. of a 30% formaldehyde solution were added. Gaseous hydrogen bromide was bubbled through the mixture at 55° C. for 4 hours. Then water was added, and the precipitate was dried in the vacuum desiccator and the dry material dissolved in 2 cc. of carbon tetrachloride. The resulting compound was crystalline tetrabromomethylhexestrol.

I have also discovered that these new compounds are useful as intermediates in the production of further estrogenic substances. For example, the halogen atoms in the tetrahalomethylhexestrols may be replaced by hydrogen atoms to produce tetramethylhexestrol, a new compound which shows estrogenic activity and which has the following structure:

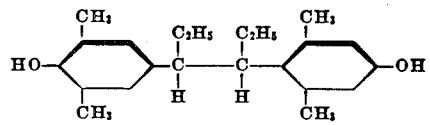

In a preferred method of preparing this new substance, tetrahalomethylhexestrol is dissolved in dioxane, to which is added hydrochloric acid and a solution of stannous chloride in dioxane and concentrated hydrochloric acid. After heating and dilution with water, a solid material separates, which is tetramethylhexestrol. Recovery and purification can be done by any of the well-understood procedures.

The tetrahalomethylhexestrols are also useful in the preparation of another new compound, tetraacetoxymethylhexestroldiacetate, which also shows estrogenic activity and is of the following structure:

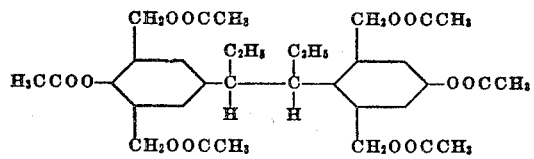

In a preferred process for the preparation of this substance, tetrahalomethylhexestrol is dissolved in acetic acid, to which is added a quantity of zinc. The mixture is heated on the steam bath and filtered. Water is added to the filtrate to cause a precipitate, which is extracted with ether and purified by recrystallization. Other suitable methods of recovery and purification may be used. The product is the new substance, tetraacetoxymethylhexestroldiacetate.

An example of the usefulness of the tetrahalomethylhexestrols in the preparation of other new compounds may be found in the process for making pyridine-halomethylhexestrol complexes. In a preferred method for obtaining these new complexes, tetrahalomethylhexestrol is dissolved in ether, and a solution of pyridine in ether is added. The precipitate which forms immediately is a pyridine-halomethylhexestrol complex, which may be recovered and re-crystallized from alcohol, or by any other suitable method for recovery and purification of such a material.

Specific examples of the preparation of tetrahalomethylhexestrol derivatives follow:

*Example 7*

1.00 g. of tetrachloromethyl hexestrol was dissolved in 60 cc. of dioxane and 10 cc. of concentrated hydrochloric acid were added. 20 g. of stannous chloride were dissolved in a mixture of 50 cc. dioxane and 50 cc. concentrated hydrochloric acid. The mixture was heated for 15 minutes on the steam bath and then left for ½ hour at room temperature. The solution was diluted with 500 cc. of water and filtered. The solid material was washed with water and dissolved in 10 cc. of acetone. Water was added to the acetone solution till cloudiness and the mixture kept in the cold. Needles separated which were filtered off and washed with diluted acetone. 0.3 g. of tetramethylhexestrol was obtained, M. P. 191–192°.

*Analysis.*— Calculated for $C_{22}H_{30}O_2$: C, 80.98%; H, 9.2%. Found: C, 80.24%; H, 9.23%.

*Example 8*

One gram of tetrachloromethylhexestrol was dissolved in 30 cc. of glacial acetic acid. Five grams of zinc were added and the mixture kept on the steam bath for 2 hours. Then the solution was filtered and water added to the filtrate. The precipitate was extracted with ether, the ether layer washed with water and dried over sodium sulfate. The filtered ether solution was concentrated to about 5 cc. volume and petroleum ether added to cloudiness. Then the mixture was kept in the cold and the crystalline precipitate filtered off. The product was twice recrystallized from carbontetrachloride. Yield, 0.25 g., M. P. 137.5–139°.

*Analysis.*—Calculated: C, 63.6%; H, 6.54%. Found: C, 62.77%; H, 6.57%.

*Example 9*

1 g. of chloromethylhexestrol was dissolved in 20 cc. of ether and a solution of 0.5 cc. of pyridine in 20 cc. of ether added. Immediately a precipitate was formed, which was filtered off and washed with ether on the filter. The precipitate was dissolved in 15 cc. of 95% alcohol and kept in the cold. Crystals were formed, which were removed by filtration and washed with acetone on the filter. More of the same compound could be obtained by concentrating and chilling the mother liquor. The pyridine chloromethylhexestrol complex is water soluble, insoluble in ether and petroleum ether. Analysis: N, 6.2%; Cl, 15.6%.

In the foregoing detailed description, I have given specific examples and procedures illustrating the invention. It is understood that these specific examples are for illustration only and that the invention can be practiced in a great variety of ways.

I claim:
1. A halomethyl derivative of hexestrol.
2. A chloromethyl derivative of hexestrol.
3. A tetrahalomethylhexestrol.
4. Tetrachloromethylhexestrol
5. A compound of the formula

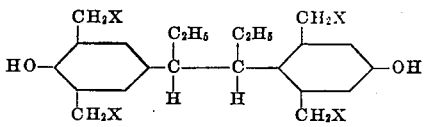

where X is a halogen radical.

EMIL KAISER.

REFERENCES CITED

The following references are of record in the file of this patent:

UNITED STATES PATENTS

| Number | Name | Date |
|---|---|---|
| 2,419,516 | Bloom et al. | Apr. 22, 1947 |

OTHER REFERENCES

Adams et al.: Organic Reactions, vol. I, pub. by Wiley (1942), N. Y., pages 64, 65, 83.